July 24, 1956     J. P. BENJAMIN     2,755,550
REEFING LINE CUTTER
Filed Oct. 7, 1955
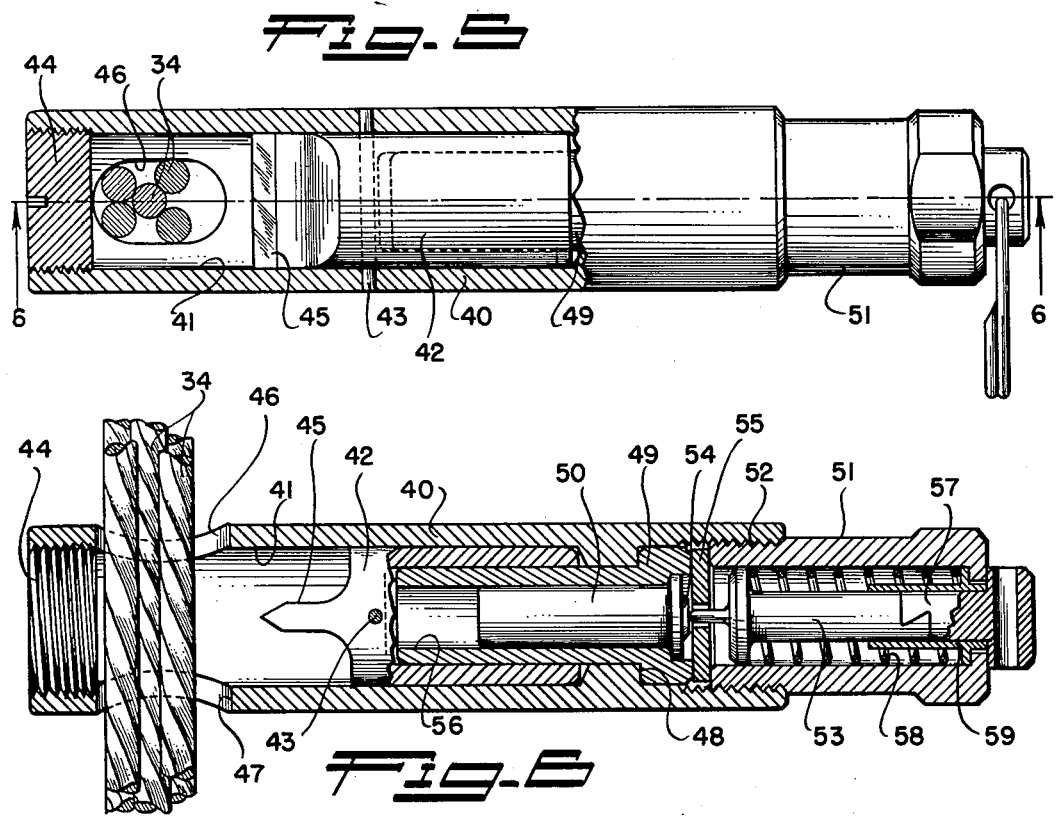
INVENTOR.
JOSEPH P. BENJAMIN
BY
Agent United States Patent Office 2,755,550
Patented July 24, 1956

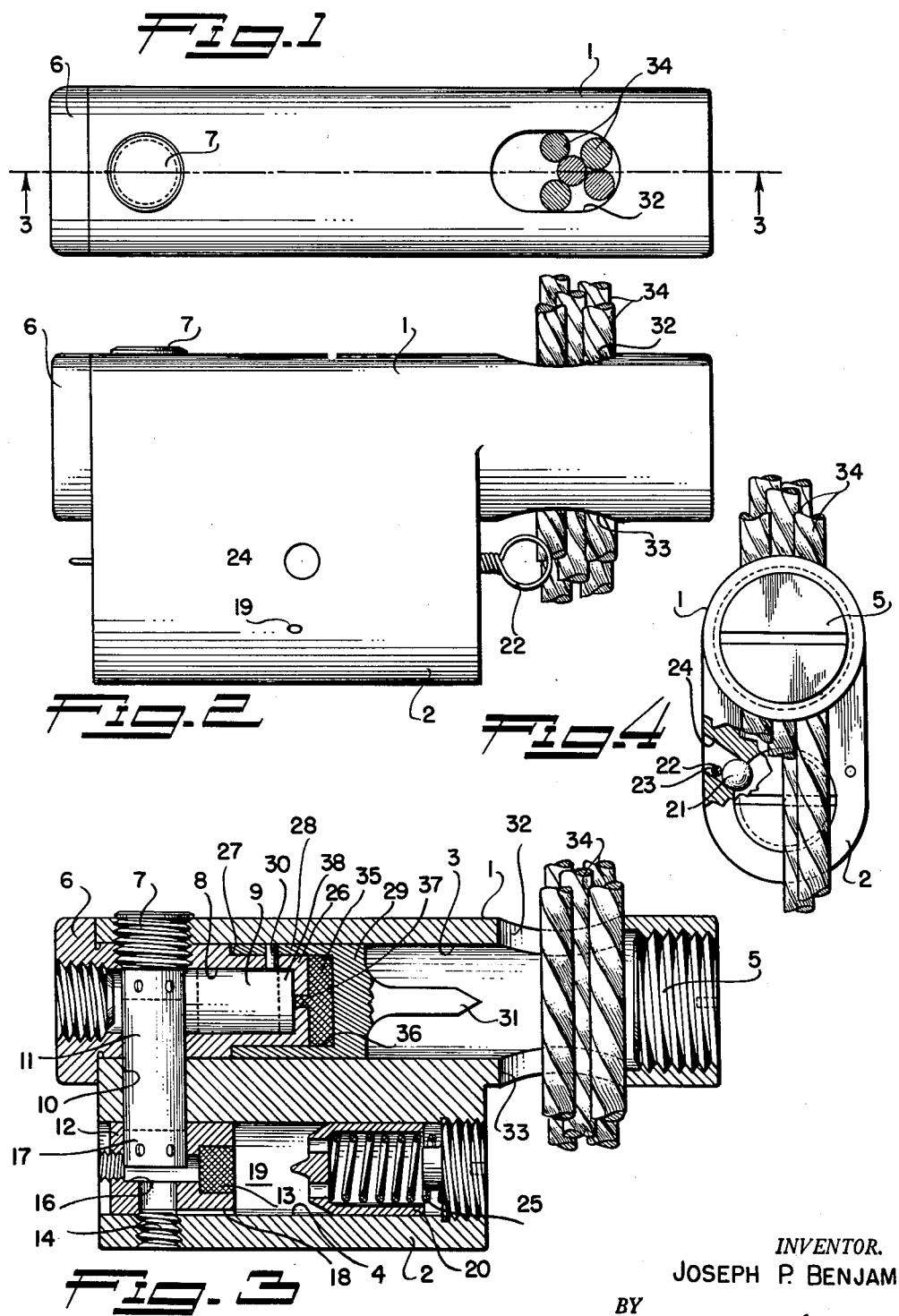

2,755,550

REEFING LINE CUTTER

Joseph P. Benjamin, Sherman Oaks, Calif., assignor to Lockheed Aircraft Corporation, Burbank, Calif.

Application October 7, 1955, Serial No. 539,195

9 Claims. (Cl. 30—180)

This invention relates generally to cutting tools and more particularly to a device for cutting reefing lines on parachutes or the like, wherein a predetermined time delay between the application of the triggering signal and the actual cutting operation is necessary.

The use of large parachutes either for air dropping heavy articles or decelerating high speed aircraft, requires the incorporation of suitable means to regulate the opening of the parachute; otherwise, the deceleration rate of the parachute is excessive. To control and regulate the deceleration rate of such parachutes, so-called reefing lines are employed at the rim of the parachute. According to conventional practice a plurality of the reefing lines are provided wherein each line is different in length. By cutting first the shortest reefing line, then the next longer line, and so on until the reefing lines have all been severed, the opening of the parachute may be regulated.

Cutting devices for this particular application must, for satisfactory operation, include time delay means whereby sequential cutting of the reefing lines may be effected in response to a single triggering action. This triggering action is obtained when the shroud lines connecting the parachute with the object are first drawn taut. A suitable cutter for this purpose must also be highly dependable in operation since a failure of but one of the cutters will destroy the effectiveness of the parachute in safely reducing the speed of the attached object. It is also important that the delay element in the line cutter be readily removable and interchangeable with other delay elements to provide the proper timing in cutting the reefing lines of a parachute under various atmospheric and load conditions.

An object of this invention is to provide a line cutter which is highly efficient and dependable in operation as well as small in size and light in weight, making the device readily suitable for use in cutting reefing lines on parachutes. The reefing line is threaded through the cutter housing and arranged relative to a cutting blade and anvil such that positive shearing action is obtained with a minimum amount of energy.

Another object of this invention is to provide a reefing line cutter which by virtue of its construction details is economical to manufacture and which will permit easily changing the time delay element to provide the delay required to meet any special situation.

Still another object of this invention is to provide a reefing line cutter having a straight knife blade which is maintained in the proper rotational position, relative to the line to be cut, by a shear pin which is designed to fail when a predetermined cutting force of sufficient magnitude to effectively sever the line is applied to the blade. The latter member is thereby quickly accelerated to accomplish the cutting operation before outside forces are able to effect undesirable rotation thereof.

Further and other objects will become apparent from a reading of the following description especially when considered in combination with the accompanying drawing wherein like numerals refer to like parts:

In the drawing:

Figure 1 is a front elevation view of the cutter;
Figure 2 is a side elevation view of the cutter;
Figure 3 is a sectional view taken on line 3—3 of Figure 1;
Figure 4 is a fragmentary end view of the cutter;
Figure 5 is a fragmentary side view of a modified form of the cutter shown in Figures 1 through 4; and
Figure 6 is a fragmentary sectional side view taken on line 6—6 of Figure 5.

Referring to Figures 1 through 4, it is seen that the cutter includes a frame or housing 1 of suitable light weight material such as aluminum. The housing is generally tubular in shape with an offset section 2 radially disposed from the basic tubular structure for housing some of the cutter actuating mechanism. As best shown in Figure 3, housing 1 is provided with a main bore 3 generally circular in cross section which extends longitudinally through the tube. A secondary bore 4 is provided in the offset section 2 of the housing which likewise extends in a longitudinal direction and parallel to the main bore. An anvil 5 is suitably secured inside one end of main bore 3. An insert 6 is slidably received within the opposite end of main bore 3 and locked in position by a set screw 7 to serve as an integral part of the housing. A cavity 8 is provided in insert 6 for receiving a time delay fuse 9. A radial passage 10 is formed in insert 6 and housing 1 providing communication between cavity 8 and secondary bore 4. Time delay fuse 11 is carried in passage 10.

A second insert 12 is carried in bore 4 and supports a primer cap 13 as shown in Figure 3 to ignite time delay fuse 11. Insert 12 is secured in position within bore 4 by means of set screw 14. Port 16 formed in insert 12 provides a confined path for the propagation of the fire from the primer cap to igniter 17 of the time delay fuse. A small bleed opening 18 is provided in insert 12, to avoid building up excessive pressures within port 16 by allowing the gases to expand into striker chamber 19 from the primer cap and time delay fuse.

Primer cap 13 is of the impact ignition type requiring only the use of a spring-loaded firing pin or striker 20 to initiate the operation of the cutter. Striker 20 is held in the retracted position shown in Figure 3 by means of a ball detent 21 and a rod type lanyard 22 as shown in Figures 2 and 4. The lanyard holds the ball detent into wedged engagement with striker 20 so long as it is inserted through bore 23 in housing 1. By removing lanyard 22, ball detent 21 is allowed to roll through opening 24 and free the striker which is thereby forced into engagement with primer cap 13 by the action of spring 25.

The inner end 26 of insert 6 is provided with an annular recess 27 for slidably receiving the skirt 28 of a piston 29. In the retracted position, piston 29 is secured to insert 6 and hence to housing 1 by means of a shear pin 30. The head of piston 29 is formed as a straight knife edge cutting blade 31 the length of which is equal to the diameter of main bore 3. The blade should preferably be made of a harder material or heat treated to be harder than anvil 5 so that it will cut slightly into the anvil and completely sever the reefing lines even though the blade of the knife does not seat perfectly on the surface of the anvil.

A pair of openings 32 and 33 are provided in housing 1 between anvil 5 and piston 29 for inserting line elements 34 such as reefing lines of a parachute therethrough. Openings 32 and 33 must be narrower than the width of knife blade 31 to prevent the lines from sliding between bore 3 and knife blade 31. It is also important that openings 32 and 33 be substantially flush with the surface of anvil 5 or that anvil 5 project beyond the edge of the opening whereby substantially all of the force exerted by piston 29 upon lines 34 is directed toward cutting the line rather than pulling the same over the edge of the opening and onto the anvil such as would be the case were the anvil not at least flush with the opening.

Knife blade 31 is arranged transversely of openings 32 and 33 in the housing so that it will intersect lines 34 passing therethrough. Shear pin 30 holds knife blade 31 in the proper rotational position relative to lines 34 only when piston 29 is in the retracted position. During the cutting stroke of the piston, which is after the shear pin has broken, the piston and knife blade is free to rotate relative to the housing. However, due to the relatively short stroke required by the piston to complete the cutting operation coupled with the high acceleration rate thereof, once released by the shear pin, there is little or no opportunity for the blade to rotate from the initial position. If desired, piston 29 may be keyed to housing 1 such as by a tongue and groove arrangement to prevent rotational movement of the knife blade during the cutting stroke. However, this tends to increase the frictional drag of piston 29 and it is not necessary when the prescribed relationship is maintained between knife balde 31, anvil 5 and openings 32 and 33.

The force for driving piston 29 and shearing shear pin 30 is obtained by an explosive powder charge 35 carried within a chamber 36 formed between piston 29 and insert 6. A small orifice 37 between chamber 36 and cavity 8 allows time delay fuse 9 to ignite the powder charge when the fuse has burned through to igniter 38 on the piston end of the time delay fuse. The explosive force or gas pressure generated by the exploding powder charge causes shear pin 30 to fail after a predetermined pressure has been built up in chamber 36 and then with ample energy the blade is almost instantaneously accelerated to a high velocity in its movement toward anvil 5. The shear pin should be designed to fail only when the force on the piston is at least sufficient to completely sever the reefing lines.

The cutter described above in connection with Figures 1 through 4 wherein primer cap 13 and striker 20 are carried in a secondary bore 4 which is radially displaced from main bore 3 produces a configuration which is of short length. Where a cutter configuration of slightly greater length is acceptable, an in-line arrangement of all cutter elements may be preferred such as is illustrated in Figures 5 and 6. Both versions are basically similar.

Referring to Figures 5 and 6 the modified cutter includes a generally tubular housing 40 having an inner bore 41 for slidably receiving a piston 42 in a manner similar to that described above in connection with Figures 1 through 4 except that a shear pin 43 engages housing 40 directly rather than through an insert as described in connection with Figure 3. An anvil 44 is secured to one end of housing 40 for cooperating with knife blade 45 on piston 42 in cutting lines 34. Openings 46 and 47 are provided in housing 40 for running lines 34 therethrough and between anvil 44 and knife blade 45. The relationship between knife blade 45, anvil 44 and openings 46 and 47 required for proper operation of the cutter is the same as that described above for the cutter configuration of Figures 1 through 4.

A radially inwardly directed flange 48 is provided on the inner wall of housing 40 to provide a seat for an annular shaped insert 49 which supports a combination explosive charge and time delay cartridge 50.

An extension 51 is removably secured to housing 40 by means of threads 52 for supporting a striker or firing pin 53 in a coaxially aligned position with respect to cartridge 50. The firing pin ignites the primer cap 54 on impact. A retaining washer 55 is firmly held between insert 49 and extension 51 for positively holding cartridge 50 seated within the insert whereby the explosive force of the cartridge produces a pressure buildup in chamber 56 for shearing pin 43. The pressure required to cause failure of pin 43 propels blade 45 forward toward anvil 44 at a high velocity, severing lines 34 which are interposed therebetween.

The cutter configuration of Figures 5 and 6 employs a Z-type sear 57 which holds firing pin 53 in a retracted position against the action of spring 58 until the sear and firing pin are pulled rearwardly, compressing spring 58 sufficiently to move the sear completely free of the firing pin guide 59, at which time the sear will slip from the firing pin and allow the latter to strike primer cap 54 on cartridge 50 and thereby initiate the cutting operation.

The operation of the cutter of either configuration is effected by releasing the striker or firing pin and igniting the primer cap in the powder train delay assembly. After a predetermined time delay the explosive charge at the end of the delay assembly is ignited causing an explosive force to produce a pressure buildup against piston 29 or 42. When the pressure buildup reaches a level sufficient to cause shear pin 30 or 43 to fail, the knife blade is propelled forward at a high velocity, cutting line 34 and bottoming against anvil 5 or 44. The proper rotational position of knife blade 31 or 45 is maintained by initially positioning the piston in the proper rotational position when retracted and holding the same in that position by the use of the shear pin until a high propelling force is built up for moving the knife.

While the cutter is primarily intended for use in connection with cutting reefing lines on parachutes it is obviously useful in any application where it is desired to sever a line element remotely in a dependable and efficient manner a predetermined time interval after actuating the triggering mechanism. The small size and light weight of the device which makes it suitable as reefing line cutter for parachutes, also adds to its utility generally.

It should be understood that certain alterations, modifications and substitutions may be made to the instant disclosure without departing from the spirit and scope of this invention as defined by the appended claims.

I claim:

1. A reefing line cutter comprising, a housing forming a generally cylindrical cavity, an anvil secured to the housing adjacent one end of the cavity, a piston slidably carried within said cylindrical cavity and being arranged to move from a retracted position away from said anvil to a line cutting position adjacent said anvil, said piston including a generally straight knife blade projecting therefrom in the direction of said anvil, said blade having a length substantially equal to the diameter of the cylindrical cavity and a generally constant thickness, said housing having openings formed therein adjacent said anvil for passing the reefing line therethrough transversely of the housing and between the blade and anvil, said openings having a width less than the length of said blade whereby the reefing line will be completely confined between the ends of the blade, a shear pin carried by said housing and engaging said piston for holding the latter in the retracted and properly aligned position relative to the reefing line, and explosive means carried by said housing for shearing said shear pin and propelling said piston toward said anvil for cutting the reefing line in response to the application of an explosive force of predetermined magnitude.

2. A cutter for severing line elements such as reefing cords on parachutes or the like comprising, a generally tubular housing, explosive means carried at one end of the housing, an anvil carried at the opposite end of the housing, a piston slidably carried within said housing between said explosive means and said anvil, said piston including a straight knife blade projecting therefrom in the direction of said anvil, said housing having a transverse opening formed therein between said anvil and said piston for passing the line element therethrough, a shear pin carried by said housing and supporting said piston in a retracted position with the knife blade rotationally arranged to transversely intersect the axis of the opening in the housing, and means responsive to an external signal for initiating the operation of said explosive means whereby a force is exerted on said piston, shearing said shear pin and propelling said knife blade toward said anvil and line element.

3. A reefing line cutter comprising, a hollow, tubular housing, an anvil secured to the housing adjacent one end thereof, a piston slidably carried within said housing for engaging said anvil, said housing having an opening formed therein adjacent said anvil and normal to the axis of the housing for receiving the reefing line to be cut, said piston having a straight knife blade forming a part thereof for engaging said anvil when moving said piston theretowards, a shear pin carried by said housing and engaging said piston for holding the blade in a retracted position relative to said anvil and in a predetermined rotational position relative to the opening, and pressure producing means carried by the housing for shearing the shear pin and forcefully moving said piston toward said anvil whereby to sever the line interposed therebetween.

4. A cutter for severing reefing lines on parachutes or the like comprising, a generally tubular housing, a piston slidably carried within said housing, said piston including a generally straight knife blade projecting from one end thereof, an anvil carried by said housing and arranged to provide a seating surface for the knife blade, said housing having openings formed therein between said piston and said anvil for receiving a reefing line, a shear pin normally holding said piston in a retracted position relative to said anvil and in a properly aligned position relative to the reefing line, and explosive means carried by said housing for shearing the shear pin and propelling said piston toward said anvil whereby to sever the reefing line inserted through said openings.

5. A cutter for severing reefing lines on parachutes or the like comprising, a generally tubular housing, explosive means carried at one end of the housing, an anvil carried at the opposite end of the housing, a piston slidably carried within said housing between said explosive means and said anvil, said piston including a straight knife blade projecting therefrom in the direction of said anvil, said housing having a transverse opening formed therein between said anvil and said piston for passing the line to be cut therethrough, means carried by said housing and engaging said piston for rotationally positioning the knife blade to intersect the axis of the transverse opening in the housing, and means responsive to an external signal for initiating the operation of said explosive means whereby a force is exerted on said piston propelling said knife blade toward said anvil.

6. A cutter for severing reefing lines on parachutes or the like comprising, a housing, said housing having an opening formed therethrough, an anvil secured to the housing adjacent one end of the opening, an explosive charge carried by said housing adjacent the opposite end of the opening, a piston slidably carried by said housing within said opening for movement between a retracted position adjacent said explosive charge to a working position adjacent said anvil, said piston including a generally straight knife blade projecting therefrom in the direction of said anvil, said blade having a length substantially equal to the width of said opening, said housing having a transverse aperture formed therein adjacent said anvil for passing the line to be cut therethrough transversely of the axis of the opening and between the blade and anvil, said aperture having a width less than the length of said blade for confining the line to be cut between the ends of the blade, means carried by said housing and engaging said piston for holding the latter in a predetermined rotational position relative to the transverse aperture, and means carried by said housing for igniting said explosive means and propelling said piston toward said anvil for cutting the line interposed therebetween.

7. A cutter for severing reefing lines on parachutes or the like comprising, a housing, said housing having an opening formed therethrough, a piston slidably carried by said housing within said opening, said piston including a generally straight knife blade projecting from one end thereof, an anvil carried by said housing and arranged to provide a seating surface for the knife blade adjacent one end of said opening, said housing having a transverse aperture formed therein between said piston and said anvil for inserting a line to be cut therethrough, a shear pin normally holding said piston in a retracted position relative to said anvil with knife blade rotationally arranged to transversely intersect the axis of the aperture in said housing, said shear pin freeing said piston for movement within said opening only in response to the application of a force on the piston which is at least sufficient to completely sever the line extending through said housing, and means carried by said housing for generating said force to release said piston and propel the same toward said anvil.

8. A cutter for severing reefing lines on parachutes or the like comprising, a housing, said housing having an opening formed therethrough, a piston slidably carried by said housing within said opening, said pison including a generally straight knife blade projecting from one end thereof, an anvil carried by said housing and arranged to provide a seating surface for the knife blade adjacent one end of said opening, said anvil being softer than said blade whereby the latter may indent the surface of the anvil and thereby insure proper mating, said housing having a transverse aperture formed therein between said piston and said anvil for inserting a line to be cut therethrough, a shear pin normally holding said piston in a retracted position relative to said anvil with the knife blade rotationally arranged to transversely intersect the axis of the aperture in said housing, said shear pin freeing said piston for movement within said opening only in response to the application of a force on the piston which is at least sufficient to completely sever the line extending through said housing, and means carried by said housing for generating said force to release said piston and propel the same toward said anvil.

9. A cutter for severing reefing lines on parachutes or the like comprising, a generally tubular housing, explosive means carried at one end of the housing, an anvil carried at the opposite end of the housing, a piston slidably carried within said housing between said explosive means and said anvil, said piston including a straight knife blade projecting therefrom in the direction of said anvil, said blade having a hardness greater than that of said anvil whereby the blade may indent the anvil on impact for proper seating, said housing having a transverse opening formed therein between said anvil and said piston for passing the line to be cut therethrough, means carried by said housing and engaging said piston for rotationally positioning the knife blade to intersect the axis of the transverse opening in the housing, and means responsive to an external signal for initiating the operation of said explosive means whereby a force is exerted on said piston propelling said knife blade toward said anvil.

No references cited.